US012005711B2

(12) United States Patent
Mou et al.

(10) Patent No.: US 12,005,711 B2
(45) Date of Patent: Jun. 11, 2024

(54) MANUFACTURING METHOD OF NARROW TYPE INKJET PRINT HEAD CHIP

(71) Applicant: Microjet Technology Co., Ltd., Hsinchu (TW)

(72) Inventors: Hao-Jan Mou, Hsinchu (TW); Rong-Ho Yu, Hsinchu (TW); Cheng-Ming Chang, Hsinchu (TW); Hsien-Chung Tai, Hsinchu (TW); Wen-Hsiung Liao, Hsinchu (TW); Chi-Feng Huang, Hsinchu (TW); Yung-Lung Han, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 511 days.

(21) Appl. No.: 17/205,297

(22) Filed: Mar. 18, 2021

(65) Prior Publication Data

US 2021/0291525 A1 Sep. 23, 2021

(30) Foreign Application Priority Data

Mar. 20, 2020 (TW) ................................ 109109503

(51) Int. Cl.
*B41J 2/16* (2006.01)

(52) U.S. Cl.
CPC ............ *B41J 2/1635* (2013.01); *B41J 2/162* (2013.01)

(58) Field of Classification Search
CPC ........ B41J 2/1635; B41J 2/162; B41J 2/1631; B41J 2202/13–14; B41J 2202/18; B41J 2202/22; B41J 2/14072; B41J 2/1601; B41J 2/0455; B41J 2/0452; B41J 2/04548; B41J 2/04501–04506; B41J 2/04528; B41J 2/04531; B41J 2/0458; B41J 2/04511–04513
See application file for complete search history.

(56) References Cited

U.S. PATENT DOCUMENTS

2003/0107616 A1* 6/2003 Huang .................. B41J 2/1631
347/56

FOREIGN PATENT DOCUMENTS

| | | |
|---|---|---|
| CN | 1388595 A | 1/2003 |
| CN | 1556435 A | 12/2004 |
| CN | 107039339 A | 8/2017 |

(Continued)

OTHER PUBLICATIONS

Alan Doolittle, Lithography and Pattern Transfer, retrieved on Jul. 13, 2017, <URL: http://web.archive.org/web/20170713181744/https://alan.ece.gatech.edu/ECE6450/Lectures/ECE6450L7-Optical%20Lithography.pdf>. (Year: 2017).*

*Primary Examiner* — Steven M Christopher
*Assistant Examiner* — Tyler J Wiegand
(74) *Attorney, Agent, or Firm* — Birch, Stewart, Kolasch & Birch, LLP

(57) ABSTRACT

The method of the present disclosure includes steps of: (S1) providing a silicon substrate; (S2) arranging and disposing an active component layer by utilizing a first type photomask on at least two high-precision regions of each of a plurality of inkjet print head chip regions on the silicon substrate; (S3) arranging and disposing a passive component layer by utilizing a second type photomask on the active component layer; and (S4) cutting the silicon substrate according to the inkjet print head chip regions so as to form the plurality of narrow type inkjet print head chips.

7 Claims, 8 Drawing Sheets

(56) References Cited

FOREIGN PATENT DOCUMENTS

| | | | |
|---|---|---|---|
| CN | 110808277 | A | 2/2020 |
| TW | 200416144 | A | 9/2004 |
| TW | 200713297 | A | 4/2007 |
| TW | 201238777 | A1 | 10/2012 |
| WO | WO 2016/132638 | A1 | 8/2016 |

* cited by examiner

MANUFACTURING METHOD OF NARROW TYPE INKJET PRINT HEAD CHIP

FIELD OF THE INVENTION

The present disclosure relates to a manufacturing method of inkjet print head chip, and more particularly to a manufacturing method of narrow type inkjet print head chip using different magnifications of photomask.

BACKGROUND OF THE INVENTION

With the rapid development of technology, the size and shape of an inkjet print head are also changing according to the requirements of different customer's, for example faster printing speeds. However, the changes in the size and shape of the inkjet head are limited by the size of the photomask in the manufacturing process, and increase the production costs.

Please refer to FIG. 1. A conventional inkjet print head chip 9 includes a plurality of electrode pads 91, a plurality of electro static discharge (ESD) protection units 92, a plurality of heaters 93, a plurality of heater switches 94, a plurality of encoders 95, a plurality of encoder switches 96, and a plurality of discharge protection units 97. The plurality of electrode pads 91 are adjacently arranged on two opposed sides of the inkjet print head chip 9. The plurality of ESD protection units 92 are arranged next to the plurality of electrode pads 91, respectively. The plurality of heaters 93 are adjacently and symmetrically arranged on the other two opposed sides of the inkjet print head chip 9. The plurality of heater switches 94 are arranged adjacent to the plurality of heaters 93, respectively. The plurality of encoders 95 are arranged adjacent to one part of the inkjet head print chip 9. The plurality of encoder switches 96 are arranged adjacent to the plurality of encoders 95, respectively. The plurality of discharge protection units 97 are adjacently arranged on another part of the inkjet print head chip 9.

Please refer to FIG. 1 and FIG. 2. In order to drive the heater 93, for example, the heater switch 94 is turned on by applying a proper voltage to the electrode pad 91, and at the same time, the corresponding heater 93 is further driven by applying a proper voltage to the electrode pad 91.

However, in the conventional inkjet print head chip 9, since the ESD protection unit 92 needs to be arranged adjacent to the corresponding electrode pad 91, and the heater switch 94 needs to be arranged adjacent to the corresponding heater 93, the flexibility in configuration is low. Furthermore, due to the size limitation of photomasks, it is difficult to produce a narrow type inkjet print head in response to customization requirements for industrial use.

SUMMARY OF THE INVENTION

An object of the present disclosure is to provide a manufacturing method of inkjet print head chip including complementary metal oxide semiconductor (CMOS) circuit or N-type metal oxide semiconductor (NMOS) circuit, which is not limited by the size of the photomask, and is able to form various lengths and shapes of print heads by changing a part of the photomask. The present invention has advantages of high flexibility and low production cost.

In accordance with an aspect of the present disclosure, a manufacturing method of narrow type inkjet print head chip is provided and includes steps of:

(S1) providing a silicon substrate, wherein the silicon substrate includes a plurality of inkjet print head chip regions, and each of the plurality of inkjet print head chip regions has a long and narrow profile and includes at least two high-precision regions;

(S2) arranging and disposing an active component layer by utilizing a first type photomask on the at least two high-precision regions, wherein the active component layer includes a plurality of electro static discharge (ESD) protection units, a plurality of encoder switches, a plurality of discharge protection units and a plurality of heater switches, and corresponding positions and quantities of the plurality of electro static discharge (ESD) protection units, the plurality of encoder switches, the plurality of discharge protection units and the plurality of heater switches are the same in the at least two high-precision regions;

(S3) arranging and disposing a passive component layer by utilizing a second type photomask on the active component layer, wherein the passive component layer includes a plurality of heaters, a plurality of electrode pads, a plurality of circuit traces and a plurality of encoders; and (S4) cutting the silicon substrate according to the inkjet print head chip regions so as to form a plurality of narrow type inkjet print head chips.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or limited to the precise embodiments disclosed.

Figure 1:
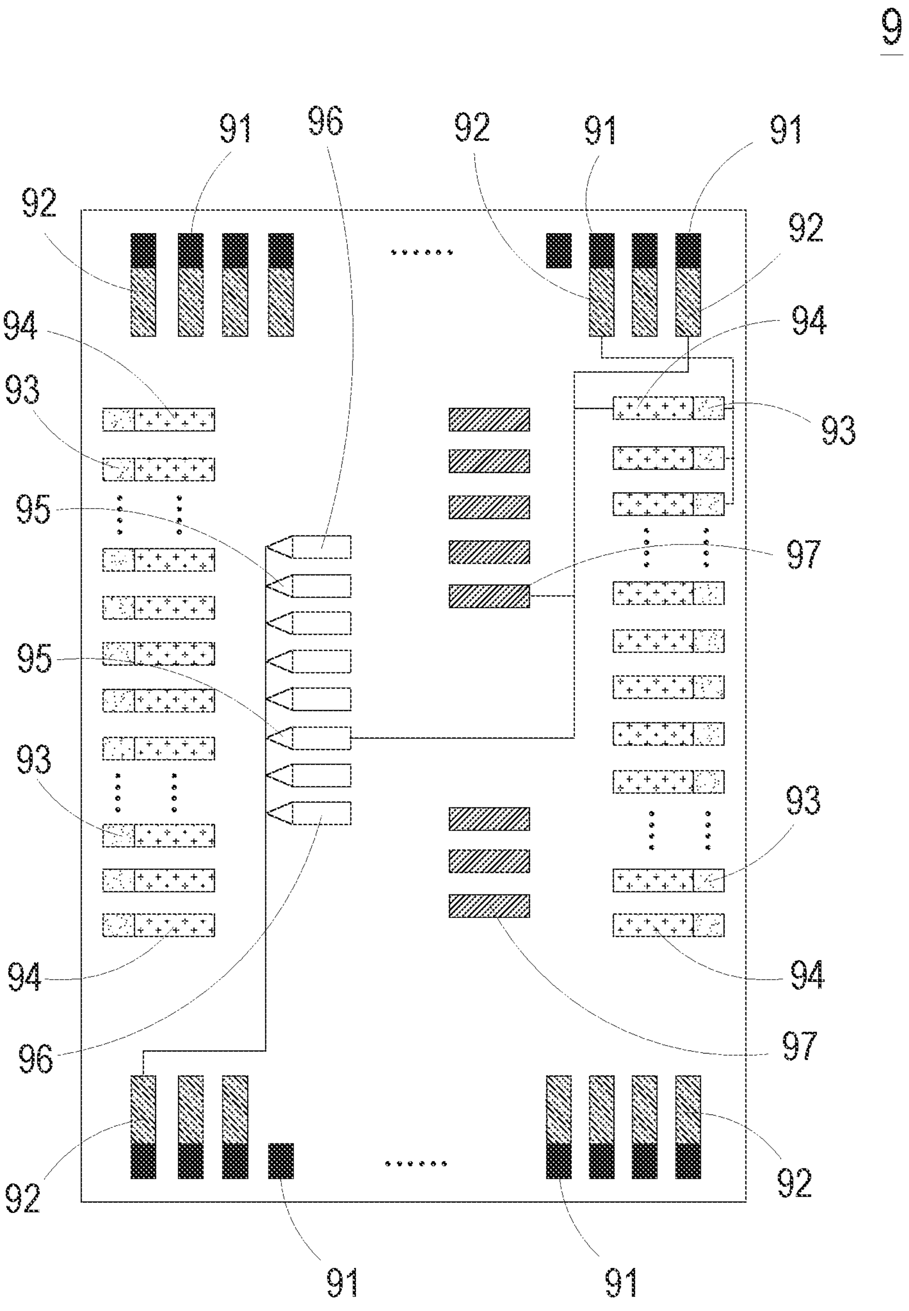
FIG. 1 PRIOR ART
FIG. 1 is a schematic diagram illustrating the layout of a conventional inkjet print head chip according to the prior art.
Figure 2:
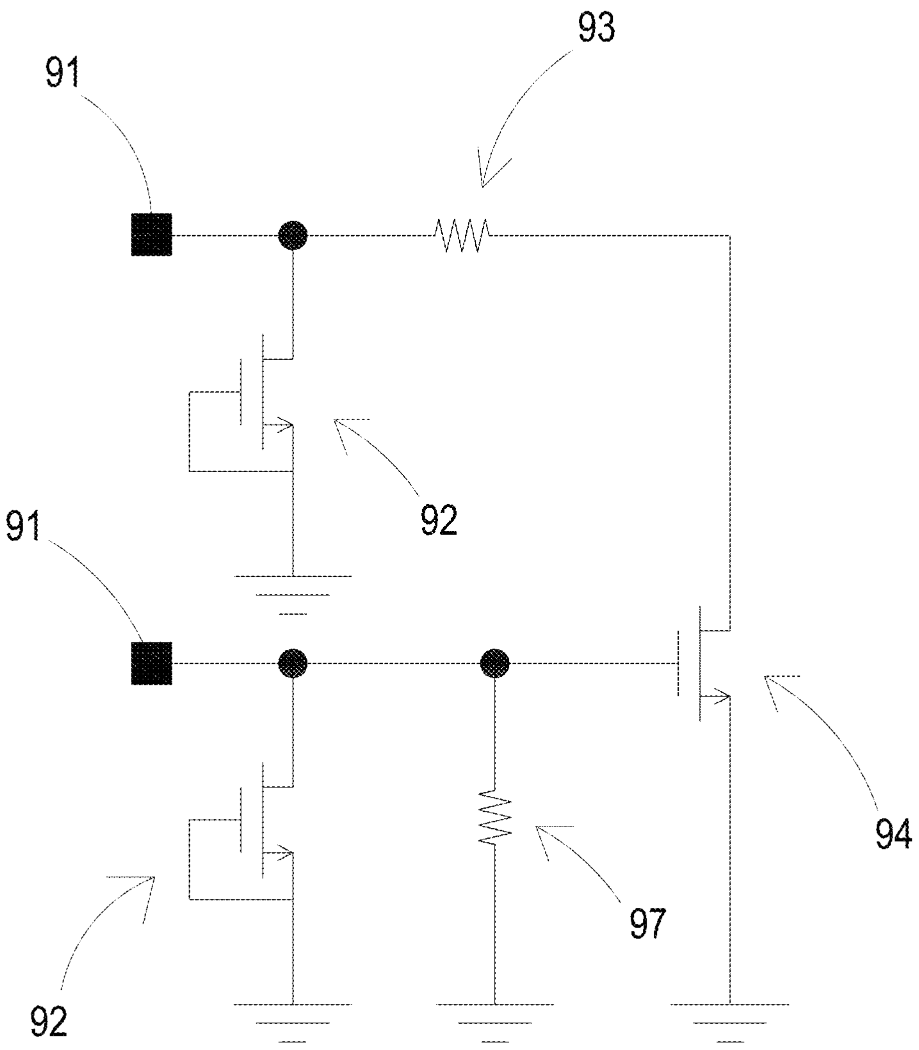
FIG. 2 is a partial circuit diagram illustrating the conventional inkjet print head chip according to the prior art.
Figure 3:
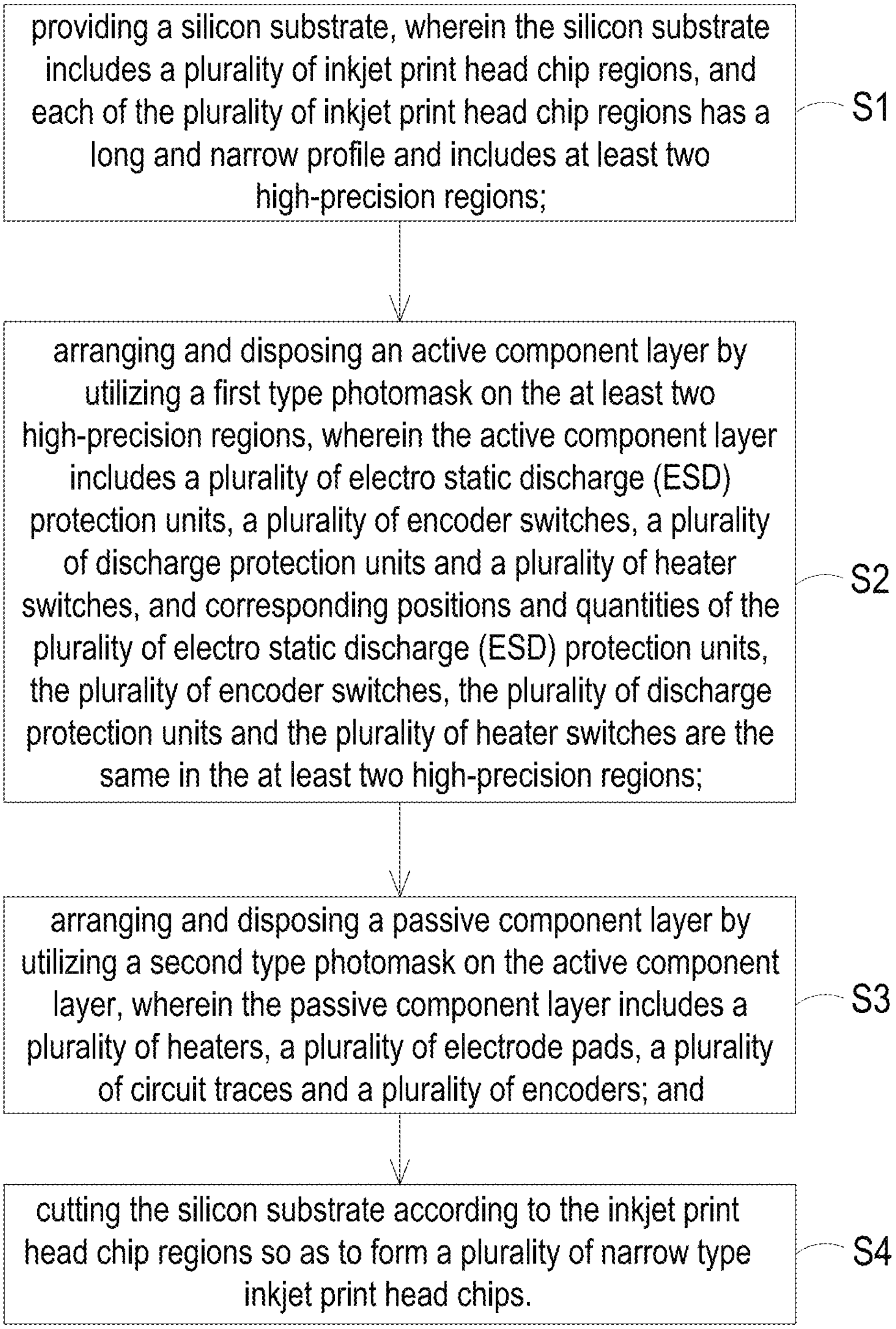
FIG. 3 is a schematic diagram illustrating a manufacturing steps of narrow type inkjet print head chip according to a first embodiment of the present disclosure.

Please refer to FIG. 3. In the embodiment, the manufacturing method of inkjet print head chip includes the following steps. In a step S1, a silicon substrate 1 is provided, wherein the silicon substrate 1 includes a plurality of inkjet print head chip regions 1A, and each of the plurality of inkjet print head chip regions 1A has a long and narrow profile and includes at least two high-precision regions. In a step S2, an active component layer 12 is arranged and disposed by utilizing a first type photomask on the at least two high-precision regions, wherein the active component layer 12 includes a plurality of electro static discharge (ESD) protection units 121, a plurality of encoder switches 122, a plurality of discharge protection units 123 and a plurality of heater switches 124. The corresponding positions and quantities of the plurality of ESD protection units 121, the plurality of encoder switches 122, the plurality of discharge protection units 123 and the plurality of heater switches 124 are the same in the at least two high-precision regions. In a step S3, a passive component layer 13 is arranged and disposed by utilizing a second type photomask on the active component layer 12, wherein the passive component layer 13 includes a plurality of heaters 131, a plurality of electrode pads 132, a plurality of circuit traces 133 and a plurality of encoders 134. In a step S4, the silicon substrate 1 is cut according to the inkjet print head chip regions 1A so as to form a plurality of narrow type inkjet print head chips 10.

Figure 4:
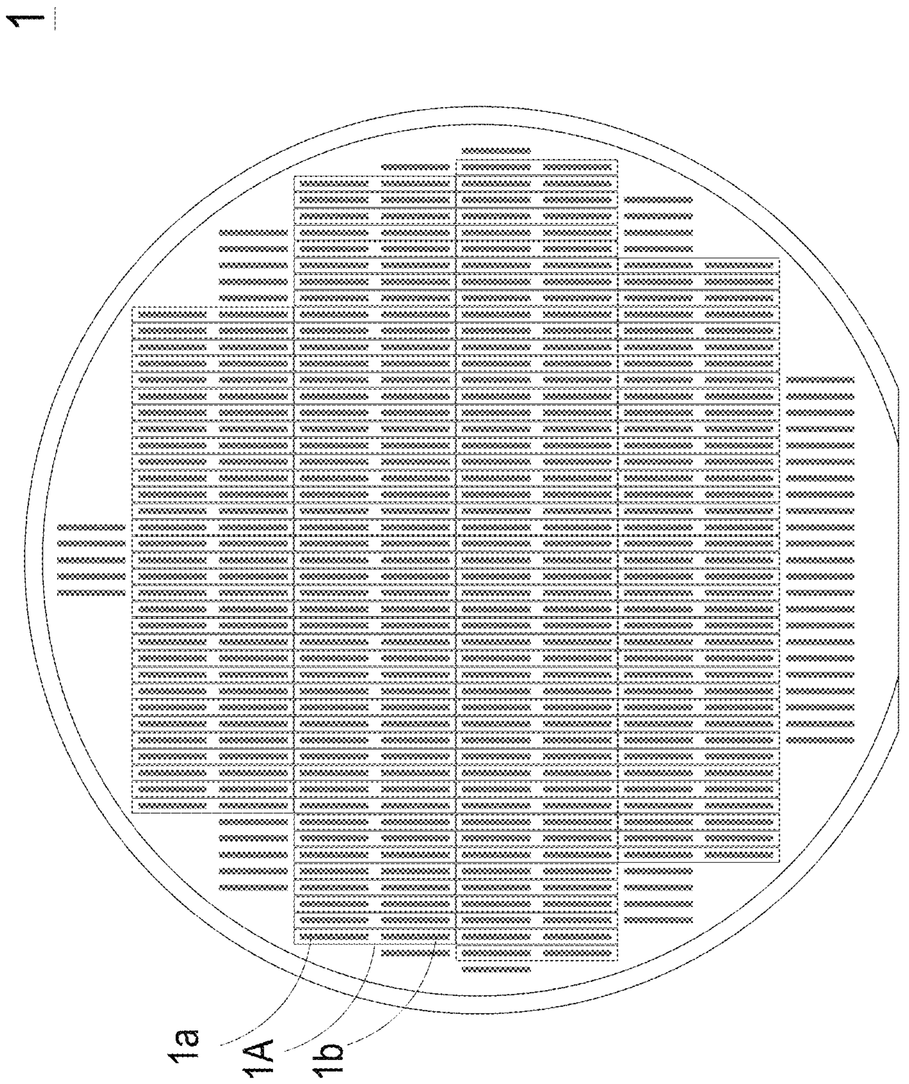
FIG. 4 is a schematic diagram illustrating the narrow type inkjet print head chips arranged on a silicon substrate according to the present disclosure.
Figure 5:
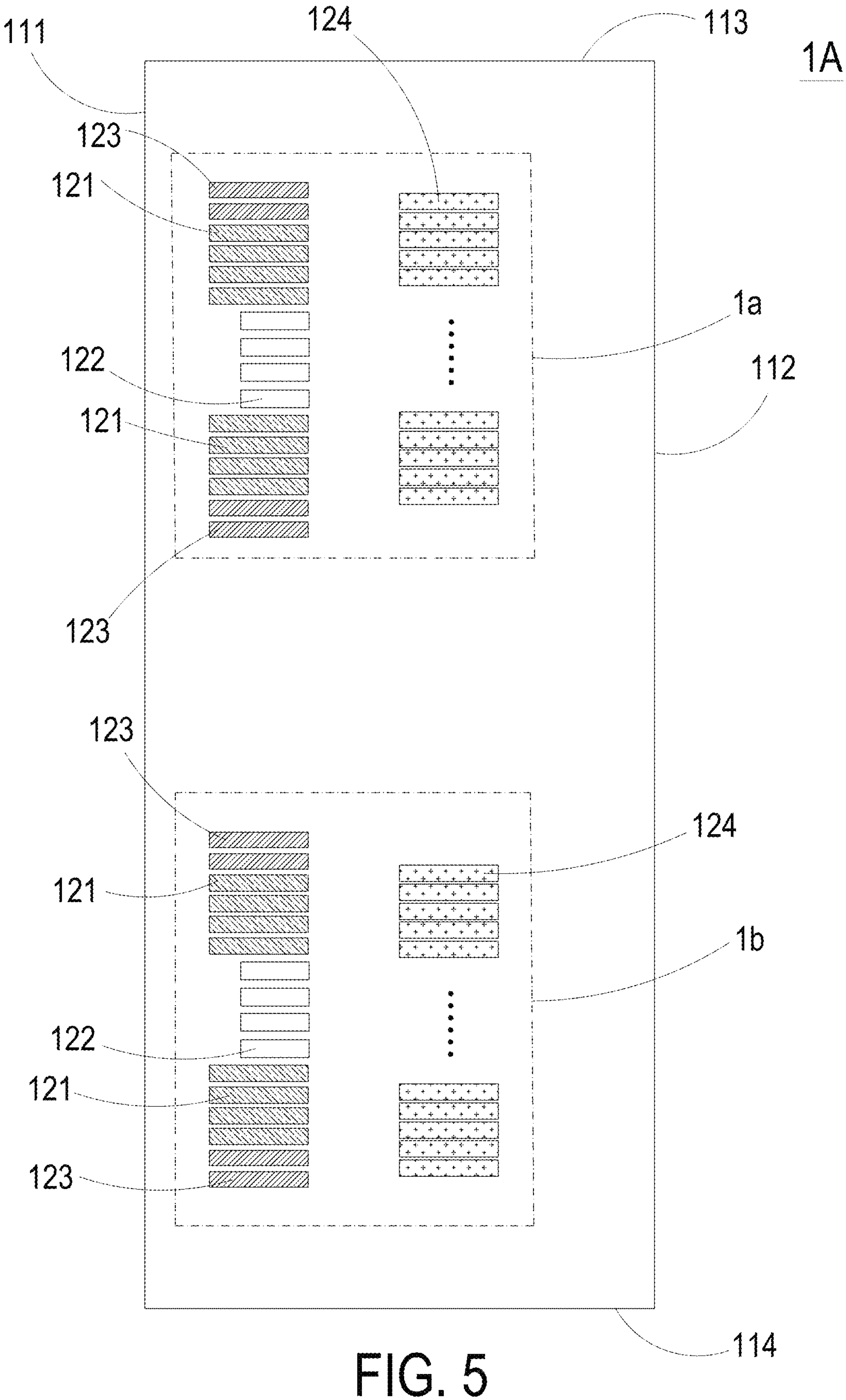
FIG. 5 is a component schematic diagram illustrating the layout of an active component layer of the narrow type inkjet print head chip according to the present disclosure.

Please refer to FIG. 3 and FIG. 4. In the step S1, the silicon substrate 1 is provided and can be a silicon wafer. In the embodiment, the silicon substrate 1 is a 6-inch silicon wafer, but not limited thereto. The silicon substrate 1 includes the plurality of inkjet print head chip regions 1A. Each of the plurality of inkjet print head chip regions 1A has a long and narrow profile and are adjacent to each other. As shown in FIG. 5, the inkjet print head chip region 1A includes a first long side 111, a second long side 112, a first short side 113 and a second short side 114. The first long side 111 and the second long side 112 are corresponding to each other. The first short side 113 and the second short side 114 are corresponding to each other and connected to the first long side 111 and the second long side 112, respectively. Each of the plurality of inkjet print head chip regions 1A includes at least two high-precision regions, for example a first high-precision region 1*a* and a second high-precision region 1*b*.

Figure 6:
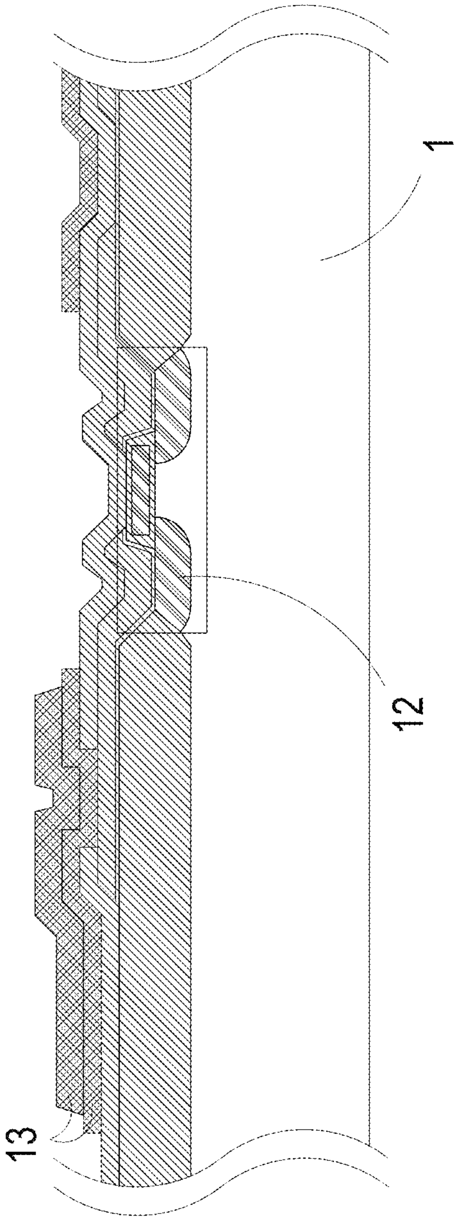
FIG. 6 is a schematic cross-sectional view illustrating the narrow type inkjet print head chip according to the present disclosure.

Please refer to FIG. 5 and FIG. 6. In the step S2, the active component layer 12 is arranged and disposed on the first high-precision region 1*a* and the second high-precision region 1*b* of each of the inkjet print head chip regions 1A on the silicon substrate 1 by the first type photomask. The active component layer 12 includes the ESD protection units 121, the encoder switches 122, the discharge protection units 123 and the heater switches 124. The ESD protection units 121 are disposed adjacent to the first long side 111 and arranged along the first long side 111. The encoder switches 122 are disposed adjacent to the first long side 111 and arranged along the first long side 111. The discharge protection units 123 are disposed adjacent to the first long side 111 and arranged along the first long side 111. In the embodiment, the ESD protection units 121, the encoder switches 122 and the discharge protection units 123 are arranged in a row along the first long side 111, but not limited thereto. The heater switches 124 are located at the middle area of the inkjet print head chip region 1A, and disposed in parallel with the ESD protection units 121, the encoder switches 122 and the discharge protection units 123. Preferably but not exclusively, the corresponding positions and quantities of the plurality of ESD protection units 121, the plurality of encoder switches 122, the plurality of discharge protection units 123 and the plurality of heater switches 124 of the active component layer 12 are the same in the first high-precision region 1*a* and the second high-precision region 1*b*.

Notably, in the embodiment, preferably but not exclusively, the discharge protection units 123 are pull down resistor (RPD) protection devices, but not limited thereto. In the embodiment, preferably but not exclusively, the EDS protection units 121, the encoder switches 122, the discharge protection units 123 and the heater switches 124 are N-type metal oxide semiconductor (NMOS) elements, respectively, but not limited thereto. In other embodiments, the ESD protection units 121, the encoder switches 122, the discharge protection units 123 and the heater switches 124 are complementary metal oxide semiconductor (CMOS) elements or bipolar elements, respectively. Since the components of the active component layer 12 have high-precision requirement, the first type photomask is a 1/5-fold stepped photomask. The 1/5-fold stepped photomask is utilized to perform the exposure process on the first high-precision region 1*a* and the second high-precision region 1*b* one by one. Consequently, the component precision of the active component layer 12 is ensured.

In addition, preferably but not exclusively, the active component layer 12 are formed by stacking multiple layers sequentially, and a plurality of first type photomasks are required in the manufacturing process. Take photomasks a1, a2, a3, a4, a5 as an example, the photomasks a1 to a5 are used to perform the exposure process on each layer respectively so as to sequentially stack the multiple layers. Notably, the narrow type inkjet print head chip 1 includes at least two high-precision regions, such as the first high-precision region 1*a* and the second high-precision region 1*b*. Since the corresponding positions and quantities of the components disposed in the first high-precision region 1*a* and the second high-precision region 1*b* are the same, when the first high-precision region 1*a* and the second high-precision region 1*b* are produced in the exposure process, the same set of photomasks (such as masks a1 to a5) can be used for exposure, and stack the components of the active component layer 12 in the first high-precision region 1*a* and the second high-precision region 1*b*. In the embodiment, the arrangements of the components in the high-precision regions (such as the first high-precision region 1*a* and the second high-precision region 1*b*) are the same, and it facilitates to reduce the time and cost of the process effectively. On the contrary, if the corresponding positions and quantities of the components disposed in the first high-precision region 1*a* and the second high-precision region 1*b* are different and the photomasks used in the first high-precision region 1*a* are for example but not limited to photomasks a1 to a5, the photomasks used in the second high-precision region 1*b* can be for example but not limited to photomasks b1 to b5. As a result, it is necessary to use the photomasks a1 to a5 to produce the first high-precision region 1*a*, and then use the photomasks b1 to b5 to produce the second high-precision region 1*b*. Therefore, the number of required photomasks is doubled, and the time of the exposure process is also increased.

Figure 7:
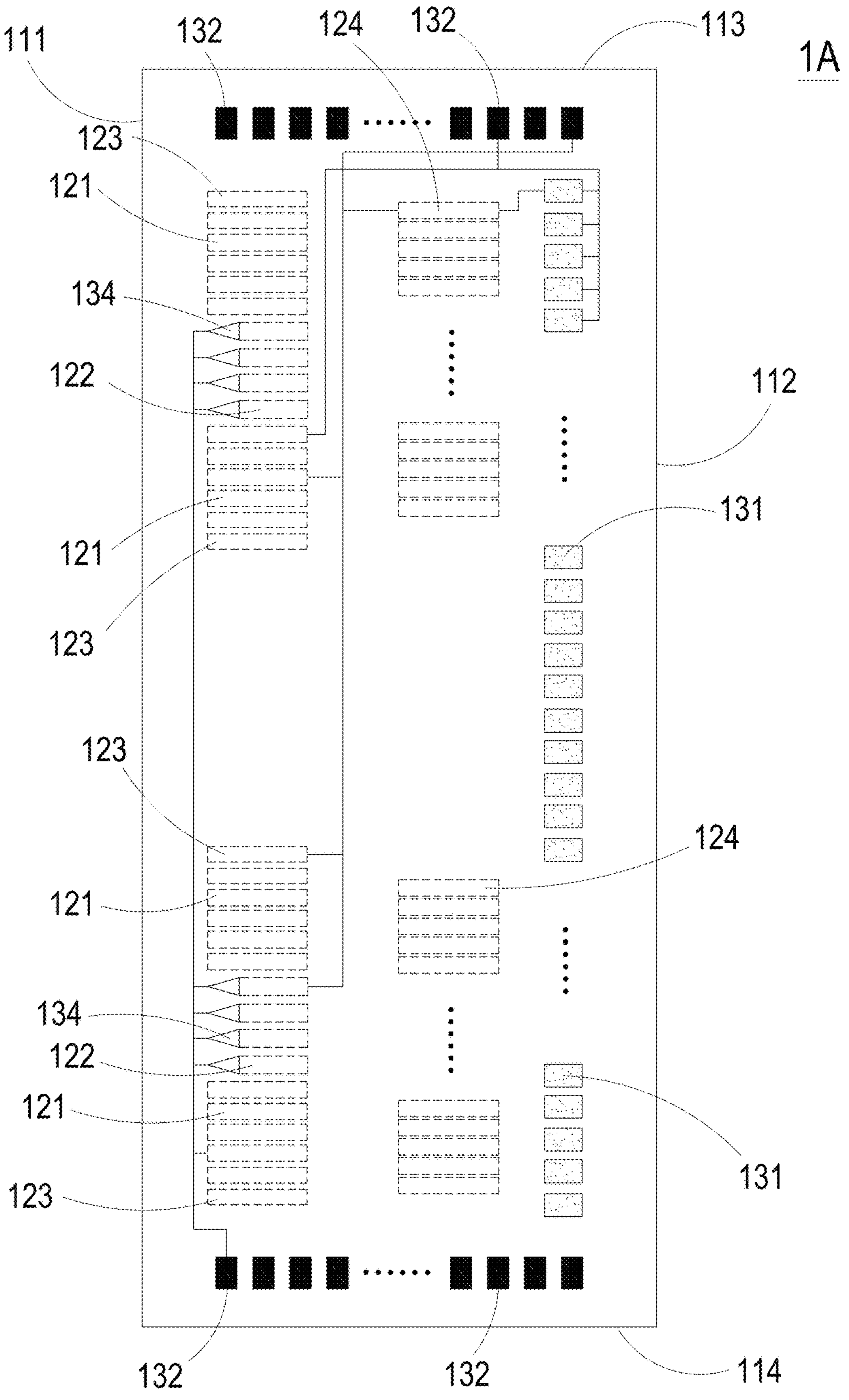
FIG. 7 is a component schematic diagram illustrating the layout of a passive component layer of the narrow type inkjet print head chip according to the present disclosure.

Please refer to FIG. 6 and FIG. 7 at the same time. In order to describe this step in more detail, the components manufactured in the previous mentioned steps are represented in dashed lines in FIG. 7. In the step S3, the second type photomask is utilized on the active component layer 12 to form the passive component layer 13. The passive component layer 13 includes the heaters 131, the electrode pads 132, the circuit traces 133 and the encoders 134. The heaters 131 are arranged along the second long side 112 of the silicon substrate 1 and are arranged in a row. The electrode pads 132 are arranged along the first short side 113 and the second short side 114. In the embodiment, a part of the electrode pads 132 are arranged along the first short side 113, and the other part of the electrode pads 132 are arranged along the second short side 114, but not limited thereto. The encoders 134 are arranged along the first long side 111 and are adjacently connected to the corresponding encoder switches 122, respectively. The circuit traces 133 are electrically connected to the ESD protection units 121, the encoder switches 122, the discharge protection units 123, the heater switches 124, the heaters 131, the electrode pads 132 and the encoders 134. Preferably but not exclusively, the circuit traces 133 are respectively disposed on different metal layers, so that the complicated circuit jumper can be reduced. The passive component layer 13 is made of at least one material selected from the group consisting of gold, aluminum, tantalum and a combination thereof, but not limited thereto.

Figure 8:
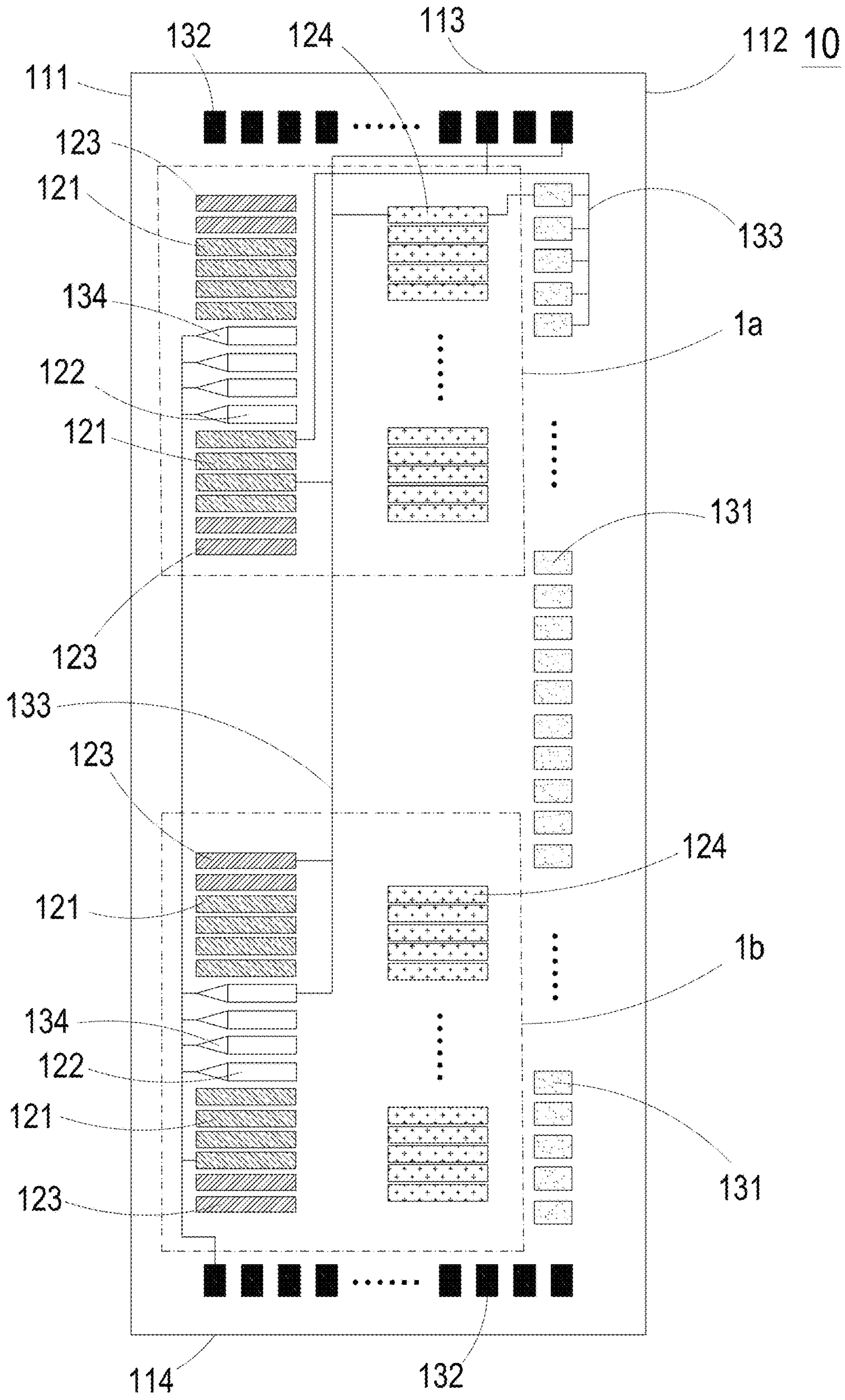
FIG. 8 is a schematic diagram illustrating the of the narrow type inkjet print head chip according to the present disclosure.

Please refer to FIG. 3 and FIG. 8. In the step S4, the silicon substrate 1 is cut according to the margins of the inkjet print head chip regions 1A. After the cutting, the narrow type inkjet print head chip 10 having a long and narrow profile is formed from each of the inkjet print head chip regions 1A, as shown in FIG. 8, so as to form a plurality of narrow type inkjet print head chips 10.

In the embodiment, the passive component layer 13 mentioned above can be the heaters 131, the electrode pads 132, the circuit traces 133 and the encoders 134, which have low-precision requirement. Therefore, the second type photomask is a 1-fold alignment photomask, and the 1-fold alignment photomask is directly utilized to perform the exposure process on the whole silicon substrate 1, as shown in FIG. 4.

In addition, taking the first high-precision region 1*a* as an example, a part of the discharge protection units 123, a part of the ESD protection units 121, the encoder switches 122, another part of the ESD protection units 121 and another part of the discharge protection units 123 are sequentially arranged in a row along the first long side 111, and the heater switches 124 are arranged and disposed in parallel with the foregoing components arranged in another row, but not limited thereto. In the embodiment, the corresponding positions and quantities of the components disposed in each high-precision region are the same. Therefore, when the components in the first high-precision region 1*a* are arranged in the above-mentioned manner, the components of the active component layer 12 in the second high-precision region 1*b* are also arranged in the same manner, so that a part of the discharge protection units 123, a part of the ESD protection units 121, the encoder switches 122, another part of the ESD protection units 121 and another part of the discharge protection units 123 are sequentially arranged in a row along the first long side 111 in the same way, and the heater switches 124 are also arranged and disposed in parallel with the foregoing components arranged in another row.

From the above descriptions, in the manufacturing process of the high-precision electronic components of the active component layer, the stepped photomasks are utilized to perform the exposure processes sequentially. In the manufacturing process of the low-precision electronic components of the passive component layer, a normal photomask is utilized to perform the exposure process in one time. Moreover, the corresponding positions and quantities of the high-precision regions of the active component layer are fixed, so that the photomasks having the same pattern are used in the front-end manufacturing process to produce the inkjet print head chips in any size. Under different requirements, 1-inch three inkjet print head chips or 1-inch multi-color wide-format inkjet print head chips can also be configured through the 1.5-inch and/or 2-inch narrow type inkjet print head chip without the need to reconstruct the photomasks of the front-end manufacturing process. Moreover, when the active component layer is configured by different high-precision regions, it is also not needed to replace the photomasks, but only needs to adjust the photomask used for the passive component layer to change the position and layout of the heaters, the electrode pads and the circuit traces of the passive component layer to complete the manufacturing without replacing the photomasks used for the active component layer. This is advantageous to save time and cost.

While the invention has been described in terms of what is presently considered to be the most practical and preferred embodiments, it is to be understood that the invention is not need to be limited to the disclosed embodiments. On the contrary, it is intended to cover various modifications and similar arrangements included within the spirit and scope of the appended claims so as to encompass all such modifications and similar structures.

What is claimed is:

1. A manufacturing method of narrow type inkjet print head chip, comprising steps of:

(S1) providing a silicon substrate, wherein the silicon substrate includes a plurality of inkjet print head chip regions, and each of the plurality of inkjet print head chip regions has a long and narrow profile and includes at least two high-precision regions, wherein each of the inkjet print head chip regions includes a first long side, a second long side, a first short side and a second short side, wherein the first long side and the second long side are corresponding to each other, the first short side and the second short side are corresponding to each other and connected to the first long side and the second long side, respectively;

(S2) arranging and disposing an active component layer by utilizing a first type photomask on the at least two high-precision regions, wherein the active component layer includes a plurality of electro static discharge (ESD) protection units, a plurality of encoder switches, a plurality of discharge protection units and a plurality of heater switches, and wherein the corresponding positions and quantities of the plurality of electro static discharge (ESD) protection units, the plurality of encoder switches, the plurality of discharge protection units and the plurality of heater switches are the same in the at least two high-precision regions, wherein the plurality of electro static discharge (ESD) protection units are disposed adjacent to the first long side and arranged along the first long side, wherein the plurality of encoder switches are disposed adjacent to the first long side and arranged along the first long side, wherein the plurality of discharge protection units are disposed adjacent to the first long side and arranged along the first long side, wherein the plurality of electro static discharge (ESD) protection units, the plurality of encoder switches and the plurality of discharge protection units are arranged in a row along the first long side, wherein the plurality of heater switches are located at a middle area of the inkjet print head chip region, and disposed in parallel with the plurality of electro static discharge (ESD) protection units, the plurality of encoder switches and the plurality of discharge protection units;

(S3) arranging and disposing a passive component layer by utilizing a second type photomask on the active component layer, wherein the passive component layer includes a plurality of heaters, a plurality of electrode pads, a plurality of circuit traces and a plurality of encoders; and (S4) cutting the silicon substrate according to the inkjet print head chip regions so as to form a plurality of narrow type inkjet print head chips.

2. The manufacturing method of narrow type inkjet print head chip according to claim 1, wherein the first type photomask is a 1/5-fold stepped photomask.

3. The manufacturing method of narrow type inkjet print head chip according to claim 2, wherein the second type photomask is a 1-fold alignment photomask.

4. The manufacturing method of narrow type inkjet print head chip according to claim 1, wherein the silicon substrate is a silicon wafer.

5. The manufacturing method of narrow type inkjet print head chip according to claim 4, wherein the silicon wafer is a 6-inch silicon wafer.

6. The manufacturing method of narrow type inkjet print head chip according to claim 1, wherein the plurality of electro static discharge (ESD) protection units, the plurality of encoder switches, the plurality of discharge protection units and the plurality of heater switches are N-type metal oxide semiconductor (NMOS) elements.

7. The manufacturing method of narrow type inkjet print head chip according to claim 1, wherein the passive component layer is made of at least one material selected from the group consisting of gold, aluminum, tantalum and a combination thereof.

* * * * *